US008373087B2

(12) United States Patent
Gnedenko et al.

(10) Patent No.: US 8,373,087 B2
(45) Date of Patent: Feb. 12, 2013

(54) PLASMA TORCH FOR USE IN A WASTE PROCESSING CHAMBER

(75) Inventors: Valeri G. Gnedenko, Moscow (RU); Alexander L. Suris, Moscow (RU); David Pegaz, Netanya (IL)

(73) Assignee: E.E.R. Enviromental Energy Resources (Israel) Ltd., Ramat Gan (IL)

( * ) Notice: Subject to any disclaimer, the term of this patent is extended or adjusted under 35 U.S.C. 154(b) by 834 days.

(21) Appl. No.: 11/912,980

(22) PCT Filed: Apr. 27, 2006

(86) PCT No.: PCT/IL2006/000513

§ 371 (c)(1), (2), (4) Date: Jan. 11, 2010

(87) PCT Pub. No.: WO2006/114793

PCT Pub. Date: Nov. 2, 2006

(65) Prior Publication Data

US 2010/0102040 A1 Apr. 29, 2010

(30) Foreign Application Priority Data

Apr. 28, 2005 (IL) .......................................... 168286

(51) Int. Cl.
*B23K 9/00* (2006.01)
*B23K 10/00* (2006.01)

(52) U.S. Cl. ............ 219/121.48; 219/121.49; 219/121.5

(58) Field of Classification Search . 219/121.48–121.51
See application file for complete search history.

(56) References Cited

U.S. PATENT DOCUMENTS

| | | | | |
|---|---|---|---|---|
| 3,858,072 | A * | 12/1974 | Dembovsky | 313/32 |
| 3,949,188 | A | 4/1976 | Tateno | |
| 4,171,931 | A | 10/1979 | Harada | |
| 4,466,824 | A * | 8/1984 | Gauvin et al. | 373/22 |
| 4,519,835 | A * | 5/1985 | Gauvin et al. | 75/10.19 |

(Continued)

FOREIGN PATENT DOCUMENTS

| | | | |
|---|---|---|---|
| EP | 0 326 318 | A2 | 8/1989 |
| JP | 56038800 | B | 9/1981 |

(Continued)

*Primary Examiner* — Anh Mai
(74) *Attorney, Agent, or Firm* — Browdy and Neimark, PLLC

(57) ABSTRACT

The invention is a plasma torch for insertion through an opening in the wall of a waste processing chamber. The plasma torch of the invention is characterized by comprising a coaxial sleeve having an upper end and a lower end. The sleeve surrounds at least the portion of the outer surface of the torch that is located in the opening, thereby forming an insulating chamber between the outer surface if the torch and the inner surface of the sleeve. At least a portion of the portion of the coaxial sleeve that surrounds at least the portion of the outer surface of the torch that is located in the opening in the wall of the processing chamber is porous or permeable to a heat exchanging fluid. The torch comprises an inlet for introducing the heat exchanging fluid into the insulating chamber. When the plasma torch is inserted through the opening, a gap exists between the processing chamber wall and the coaxial sleeve. Thus the coaxial sleeve and the insulating chamber shield the outer surface of the plasma torch from a significant amount of the heat that radiates from the processing chamber wall and from inside the processing chamber and the heat exchanging fluid that flows through the inlet exits the insulating chamber into the processing chamber.

16 Claims, 5 Drawing Sheets

U.S. PATENT DOCUMENTS 4,671,944 A 6/1987 Schramm
4,787,320 A * 11/1988 Raaness et al. ............... 110/250
4,912,296 A * 3/1990 Schlienger ............... 219/121.59
5,103,072 A * 4/1992 Eikeland et al. ......... 219/121.52
5,132,512 A * 7/1992 Sanders et al. ............. 219/121.5
5,363,781 A * 11/1994 Chang et al. .................. 110/250
5,443,572 A * 8/1995 Wilkinson et al. .............. 266/46
5,514,848 A * 5/1996 Ross et al. ............... 219/121.52
5,560,844 A 10/1996 Boulos et al.
5,695,662 A 12/1997 Couch, Jr. et al.
6,693,253 B2 * 2/2004 Boulos et al. ............ 219/121.52
6,744,006 B2 6/2004 Johnson et al.

FOREIGN PATENT DOCUMENTS

JP 04124445 A1 4/1992
JP 11128882 A1 5/1999
JP 11291023 A 10/1999
JP 2003530679 A 10/2003

* cited by examiner

PLASMA TORCH FOR USE IN A WASTE PROCESSING CHAMBER

FIELD OF THE INVENTION

The present invention relates to an apparatus for processing waste. In particular the present invention relates to an improved, plasma torch that is used in applications such as waste processing plants.

BACKGROUND OF THE INVENTION

The processing of waste including municipal waste, medical waste, toxic and radioactive waste by means of plasma torch based waste processing plants is well known.

Due to the high temperatures generated in processing plants by plasma torches, various cooling means are necessary to prevent localized overheating which can have detrimental effects on the components of the plant. One area that requires cooling is the opening in the plant chamber wall that is located typically at the lower part thereof to facilitate installation and removal of the plasma torch. A gap separates the outer surface of the plasma torch that is inserted through the opening, from the surrounding chamber wall. In order to prevent heat damage to the outside metal shell of the chamber wall, caused by heat radiating through the gap from inside the chamber, a water cooled shield is typically provided on the outside surface of the chamber in proximity to the plasma torch that is installed in the opening.

After several hours of running time of the processing plant, the inner surface of the lower part of the chamber may reach temperatures of up to 1800-2100 K. Despite the gap that separates the plasma torch from the surrounding chamber wall, the body of the plasma torch absorbs the heat that radiates from the chamber wall. This causes the temperature of the outer wall of the plasma torch to rise, which decreases the efficiency of the process. Additionally, this can result in shortening the life of the plasma torch. The plasma torch is usually cooled by a suitable liquid coolant such as water in order to prevent damage to the plasma torch. This coolant must be capable of removing heat build-up not only as a result of normal operation of the torch, but as a result of radiation from the surrounding chamber wall as well.

The size of the gap is one of the factors in determining the amount of heat losses from the processing chamber. Reducing the gap allows less heat to radiate out of the chamber, thereby reducing the heat losses from the chamber, as well as potential damage to the outside of the chamber. In addition to the width of the gap, heat losses are further dependent on the temperature difference between the inside of the chamber and the cooled outside of the chamber wall and the outer surface of the plasma torch.

Another problem related to the operation of a plasma torch is caused when the plasma forming gas that is used is air. Although air is the least expensive gas that may be used to produce the high temperature plasma jet, the use of air leads to a relatively short life for the plasma torch due to high temperature oxidation of the metal components of the torch.

When air is utilized as the plasma forming gas of the plasma torch, large quantities of hot oxidizing gas enter the chamber. However, air is composed of mostly nitrogen, which dilutes the product gasses and decreases its ability to yield a high calorific value. Therefore, steam is often used as an additional oxidizing gas. However, since it is problematic to use steam as the plasma forming gas in the plasma torch, the steam is generally fed at low temperatures to the chamber.

If the temperature of the oxidizing agent that is provided to assist in oxidizing organic material of the treated waste is low, it may lead to cooling the location near the inlet of the oxidizing agent, and to the appearance of abnormalities in the movement of the waste through the chamber. These abnormalities may further lead to larger problems in the lower part of the chamber such as congestion of the apparatus and increasing the viscosity of the molten material, as well as problems in the shaft, such as bridging, i.e. a blockage in the form of a bridge that occurs as a result of the creation of solid material in the chamber.

U.S. Pat. No. 5,695,662 discloses a plasma arc torch that is utilized to cut sheet metal such as thick plates of steel, thin plates of galvanized metal, etc. When the piercing begins, prior to the metal being cut through, the molten metal is splashed upward onto the torch. This is undesirable because it can destabilize the arc, causing it to gouge the nozzle, which can reduce the life of the nozzle, or even destroy it. Therefore, U.S. Pat. No. 5,695,662 provides a high velocity flow of an oxygen rich secondary gas mixture around the nozzle to form a cold layer of gas that is used as a shield to protect the nozzle and other torch components adjacent to the workpiece from splattered molten metal. Additionally, using an oxygen rich secondary gas mixture improves the piecing capabilities of the torch by allowing a cleaner and deeper penetration into the metal than torches utilizing other gas mixtures. The secondary gas is introduced at the upper end of the torch, travels through the torch body toward the nozzle, passes through a ring having an array of off-center slits, thereby introducing a swirling movement to the flow, and exits the torch in a swirling flow immediately adjacent to the plasma arc. However, since the plasma cutter is generally not situated in an enclosed, heat radiating environment, the detrimental effect caused by external heat radiating on the outer surface of the plasma torch is not present. Therefore, U.S. Pat. No. 5,695,662 does not relate to providing means for cooling the longitudinal outer surface of a plasma torch.

U.S. Pat. No. 3,949,188 discloses an arc transfer torch having a cathode rod and two coaxial annular bodies. An inactive gas is supplied in the annular space between the cathode rod and the first annular body, establishing an arc between the cathode rod and a piece of metal to be cut. An active gas is supplied in the annular space between the first and second annular bodies, establishing plasma composed of the active gas that is heated at a high temperature. According to U.S. Pat. No. 3,949,188, heat losses at the nozzle aperture of the second annular body decrease if the flow rate of the inactive gas is decreased below a certain critical value. U.S. Pat. No. 3,949,188 does not relate to any method of cooling the longitudinal outer surface of the plasma torch at all, and only relates to cooling the nozzle of the second annular body by cooling water that is supplied thereto.

U.S. Pat. No. 5,514,848 discloses a plasma torch having cylindrical symmetry. The internal passage between the cathode and anode is shaped to include a restriction that accelerates the follow of the plasma gas introduced at the cathode end. According to the inventors the result of the restriction is to increase the arc length, while allowing a lower amperage to voltage ratio for a given power input. The part of the torch between the cathode assembly and anode is surrounded by a coaxial cylinder that forms a cooling chamber through which a cooling fluid, which enters the chamber via an inlet at the bottom (anode) end of the torch and exits through an outlet at the top (cathode), is circulated.

It is therefore an aim of the present invention to provide a plasma torch arrangement that overcomes the limitations of prior art arrangements.

It is another aim of the present invention to provide such an arrangement that introduces a preheated oxidizing medium to the processing chamber of a plasma waste processing plant It is another aim of the present invention to provide such an arrangement that minimizes heat losses in a plasma waste processing plant.

Other purposes and advantages of the present invention will appear as the description proceeds.

SUMMARY OF THE INVENTION

The present invention relates to a plasma torch for insertion through an opening in the wall of a waste processing chamber, the waste processing chamber comprising at least one liquid outlet at the lower part thereof, for removing molten material therefrom, the plasma torch comprising a body having a front end, a rear end, a longitudinal outer surface, an outlet through which the high temperature plasma jet exits and a heat protecting ring, both located at the front end; the plasma torch characterized by comprising a coaxial sleeve having an upper end and a lower end, the sleeve surrounding at least the portion of the outer surface that is located in the opening, thereby forming an insulating chamber between the outer surface and the sleeve.

When the plasma torch is inserted through the opening, a gap exists between the processing chamber wall and the coaxial sleeve, whereby the coaxial sleeve and the insulating chamber shield the outer surface of the plasma torch from a significant amount of the heat that radiates from the processing chamber wall and from inside the processing chamber. At least a portion of the coaxial sleeve that is located in the opening is porous or permeable to a heat exchanging fluid, the torch comprising an inlet for introducing the heat exchanging fluid into the insulating chamber.

When the plasma torch is operated, and when heat exchanging fluid is introduced through the inlet into the insulating chamber, the heat exchanging fluid passes through the porous or permeable portion out or the insulating chamber, thereby absorbing heat that radiates from the processing chamber wall and from inside the processing chamber, and carrying the absorbed heat away from the plasma torch and out of the gap.

The plasma torch comprises an annular spacing element located between the front end and the rear end, for joining the upper end of the coaxial sleeve thereto.

According to one aspect, at least a portion of the outer surface of the torch is recessed radially inward, wherein the lower end of the coaxial sleeve is in contact with the heat protecting ring, and the upper end of the coaxial sleeve is sealed to the non-recessed portion of the outer surface, thereby forming the insulating chamber.

The upper end of the coaxial sleeve is sealed to the outer surface of the torch or to the annular spacing element, and the lower end of the sleeve is sealed to the heat protecting ring by a method chosen from the group consisting of: soldering; welding; use of a glass wool seal.

According to one aspect, the lower end of the coaxial sleeve is in contact with, but not sealed to the heat protecting ring, whereby the heat exchanging fluid at least partially passes between the sleeve and the ring. Optionally, the heat protecting ring is water cooled.

The ratio of the outer diameter of the coaxial sleeve to the inner diameter of the insulating chamber of said torch that is surrounded by said sleeve is preferably in the range of 1.01-1.5.

The inlet for introducing heat exchanging fluid to the sleeve may be situated at the portion of the sleeve that extends out of the chamber. Alternatively, the inlet traverses the body of the torch from the rear end. Further alternatively, the inlet traverses the body of the torch from the outer surface.

The heat exchanging fluid may be any suitable fluid that is capable of absorbing heat and carrying it away from the torch and out of the gap.

Preferably, the heat exchanging fluid is an oxygen rich gas and may be chosen from the group consisting of: steam; air; oxygen; $CO_2$; or a mixture thereof.

Preferably, the ratio of the cross-sectional area of the gap at the front end of the torch to the cross-sectional area of the outlet of the torch is in the range of 0.5-20.

Preferably, the torch utilizes nitrogen rich gas as plasma forming gas. Preferably, the coaxial sleeve is made of a high temperature resisting material chosen from the group consisting of: stainless steel; ceramic; alloys; a mixture thereof.

Preferably, the ratio of the diameter of the output end of the plasma torch to the minimal perpendicular distance from the gap at the front end of the plasma torch to a horizontal plane including the central axis of an outlet for discharging liquid slag located at the lower part of the waste processing chamber is preferably in the range of 0.02-0.3.

DETAILED DESCRIPTION OF THE PREFERRED EMBODIMENTS

The term “waste converting/processing apparatus/plant” herein includes any apparatus adapted for treating, processing or disposing of any waste materials, including municipal waste (MSW), household waste, industrial waste, medical waste, sewage sludge waste (SSW), radioactive waste and other types of waste, in particular, by means of plasma treatment.

The term “porous” or “permeable” as used herein includes any membrane or material having pores, openings, holes or slits, which can be permeated or penetrated by fluids.

The present invention is directed to a plasma torch arrangement that is used for heating material in a processing plant, for example, including shaft furnaces for processing metal or for processing waste.

Figure 1:
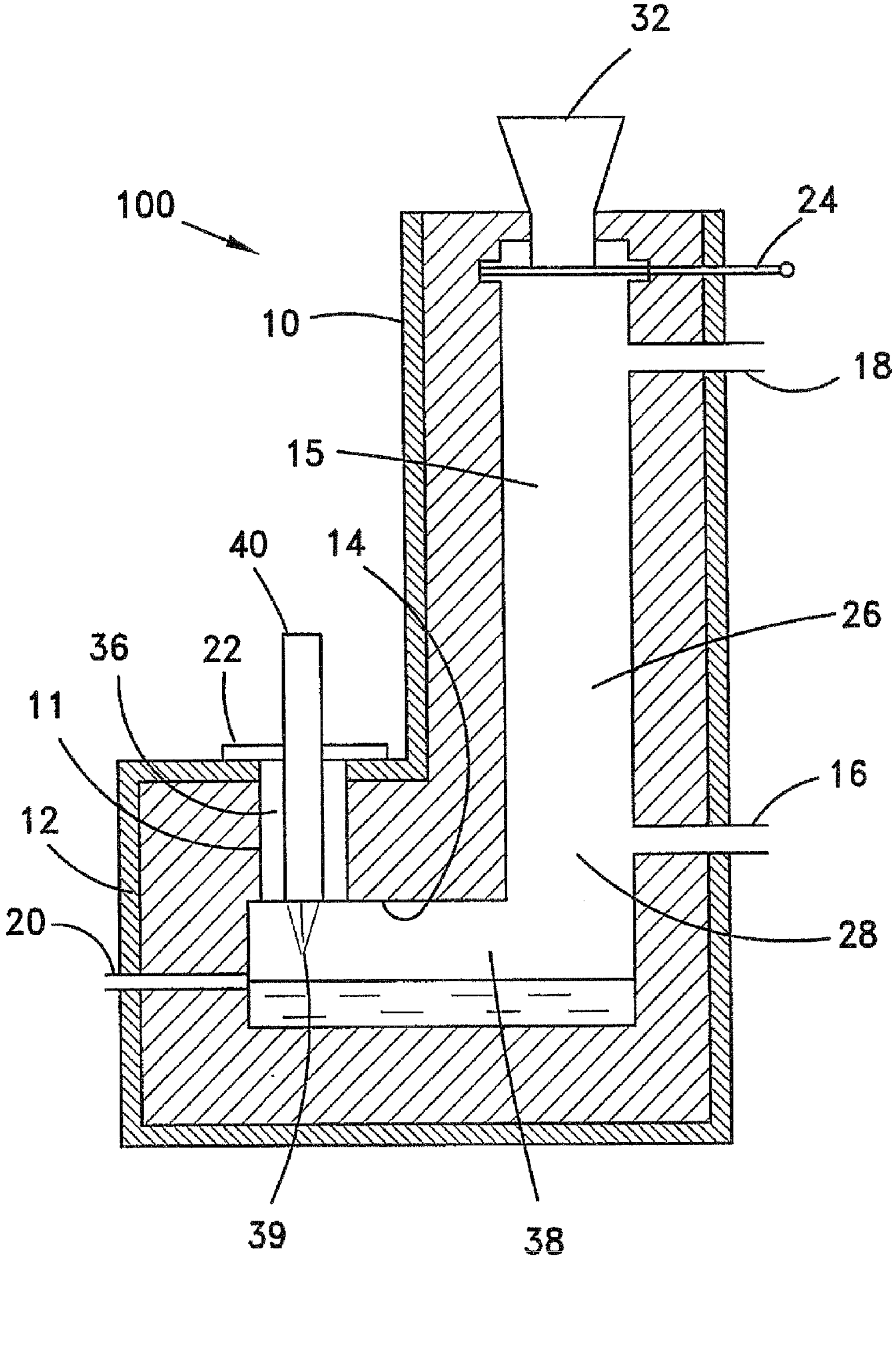
Fig. 1 (PRIOR ART)
FIG. 1 shows, schematically, the general layout and main elements of a typical waste plasma processing apparatus of the prior art.

Referring to FIG. 1, a typical plasma waste processing plant, designated by the numeral (100), comprises a processing chamber (10). Typically, the waste is loaded into a loading chamber (32) at the upper part of the vertical shaft of the chamber (10) and passes through an arrangement of shutters (24), which prevent air from entering the chamber (10).

The processing chamber (10) also comprises a drying zone (15) situated in proximity to the loading chamber (32) where the moisture content of the waste is reduced and partial softening of some of the waste takes place; a pyrolysis zone (26) situated downstream of the drying zone (15), where, depending on operating conditions and the amount of time that the waste spends in the zone (26), varying quantities of pyrolytic gas, pyrolytic oil and char are formed; a gasification zone (28) where interaction of char with oxygen, steam or $CO_2$ occurs; a melting zone (38), where inorganic components of waste are melted by at least one plasma torch (40). Molten material accumulates at the lower part of the chamber (10), and is periodically or continuously removed through at least one liquid outlet (20) associated with one or more collection reservoirs (not shown). Oxidizing material may be fed directly to the gasification zone (28) through inlet (16). The processing chamber (10) further comprises at the upper end thereof at least one gas outlet (18), for channeling away product gasses.

The inner facing surface (14) of processing chamber (10), particularly in the melting zone (38), is typically lined with one or more suitable refractory materials, such as for example alumina, alumina-silica, magnesite, chrome-magnesite, chamotte or firebrick. Typically, the processing chamber (10), and generally the plant (100) as a whole, is covered by a metal shell (12) or casing to improve mechanical integrity thereof and to enable the processing chamber (10) to be hermetically sealed with respect to the external environment.

An opening (11) exists in the lower part of the processing chamber (10) leading into melting zone (38) for introducing plasma torch (40). The diameter of the opening (11) is greater than the outer diameter of the plasma torch (40), thereby resulting in a gap (36) between the plasma torch (40) and the processing chamber (10) wall. In order to prevent heat damage to the outside metal shell (12) of the processing chamber (10) due to heat radiating through the gap (36) from inside the processing chamber (10), an upper shield (22) that is typically water cooled is provided outside the processing chamber (10), surrounding and in close proximity to the plasma torch (40), and covering part of the surrounding metal shell (12).

A conventional plasma torch (40) typically has cylindrical symmetry, and shall be described as such herein, however, it is understood that a plasma torch (40) of essentially any cross sectional shape may be utilized in accordance with the description of the present invention, *mutatis mutandis*.

Figure 2:
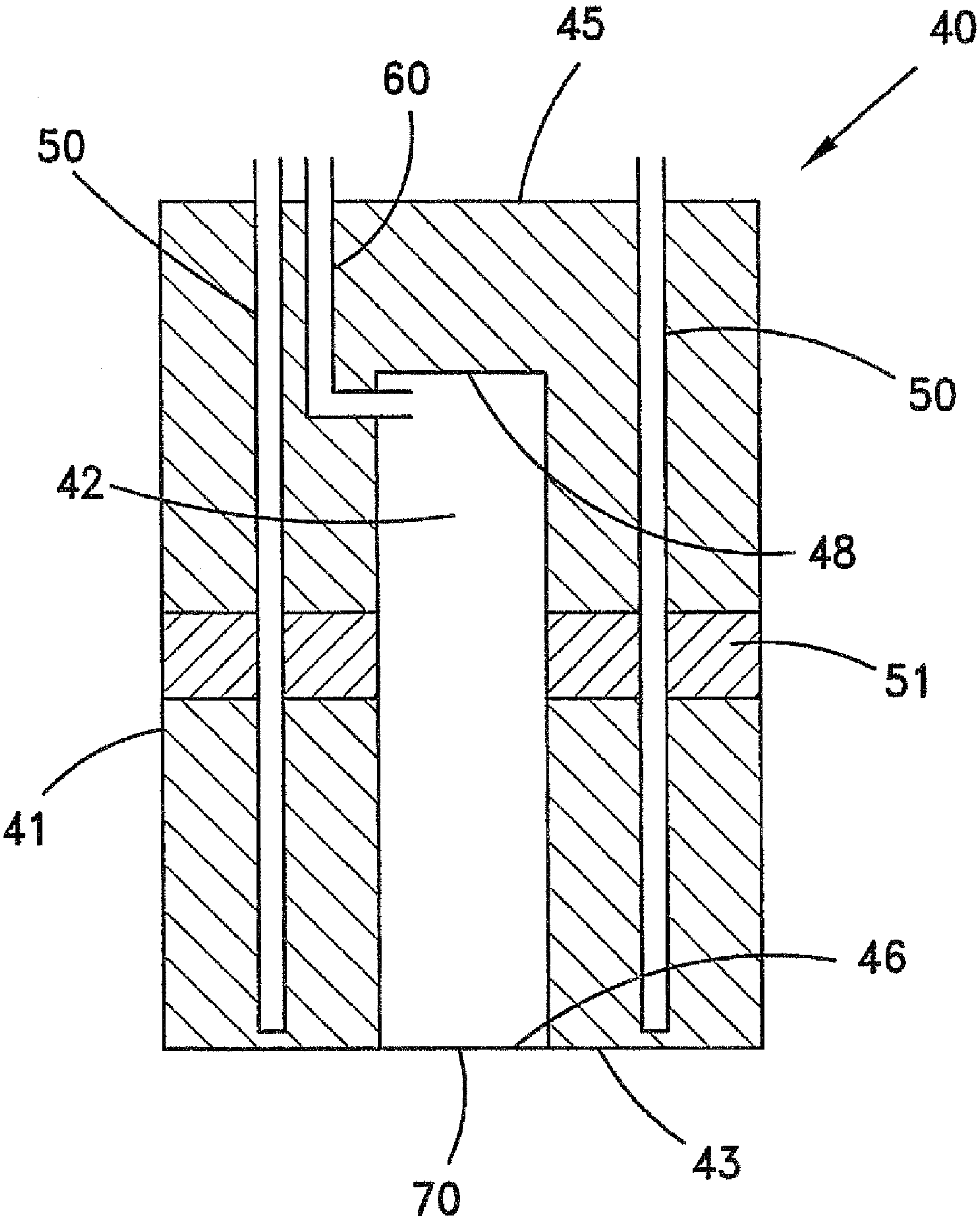
Fig. 2 (PRIOR ART)
FIG. 2 shows, schematically, a longitudinal cross section view of a typical prior art plasma torch.

A prior art electric arc plasma torch (40), is shown schematically in longitudinal cross-sectional view in FIG. 2. A plasma torch (40) is a system which serves as a source of energy to melt and vitrify inorganic components of waste, and controls the thermal conditions inside the processing chamber (10). A plasma torch (40) having cylindrical symmetry typically comprises a central channel (42) situated within the torch body (40) having an outlet (70) at the front end (43) of the torch body (40). A cathode and an anode are situated at opposite ends (46), (48), of the channel (42), separated from each other by an electric insulator (51). An electric arc is formed between these two electrodes. Typically, though not necessarily, the anode is situated at the lower end (46) of the channel (42) and the cathode at the upper end (48) thereof. A gas inlet pipe (60) for introducing the plasma forming gas to the channel (42) is situated in proximity. to the upper end (48) thereof. The electric field between the cathode and anode in channel (42) ionizes the atoms of the plasma forming gas and generates a plasma or high temperature and high velocity jet flowing toward and out of the outlet (70). Although the details of the features of the cathode, anode and the wiring to and from them are not shown in the figures, they can have many embodiments that are well known in the art. An annular passageway (50) is defined between the channel (42) and the outer surface (41) of the torch (40). Cooling water flows in the annular passageway (50) to cool the torch (40) which heats up during operation.

Figure 3:
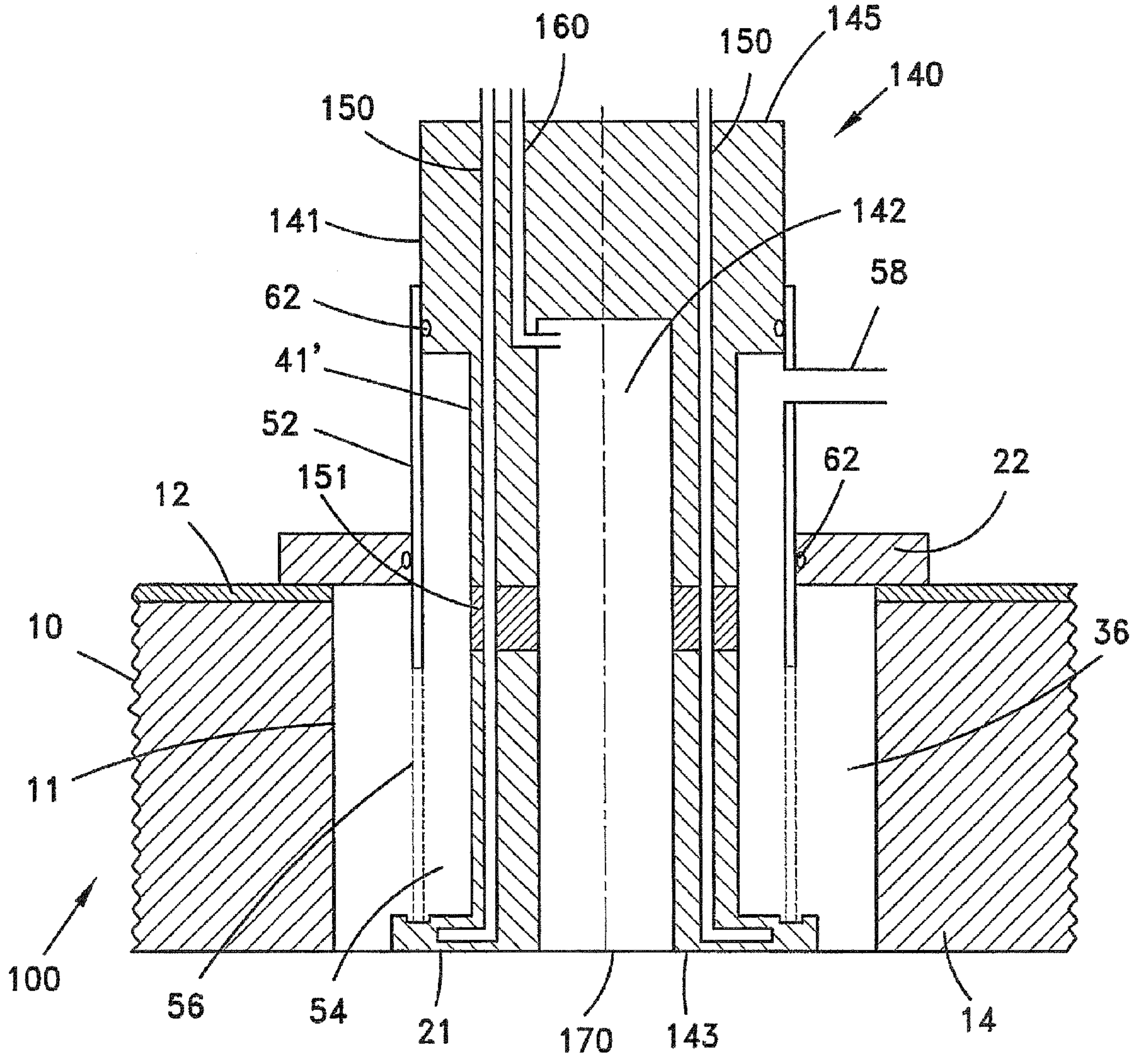
FIG. 3 shows, schematically, a longitudinal cross section view of one embodiment of the plasma torch of the present invention, inserted in an opening in the lower part of a processing chamber.

Referring to FIG. 3, a preferred embodiment of the plasma torch (140) arrangement of the present invention is illustrated in a longitudinal cross-sectional view. Plasma torch (140) is shown installed in the lower part of a processing chamber (10).

The plasma torch (140) comprises a front end (143) and a rear end (145). The front end (143) is directed toward the inside of the processing chamber (10) and positioned in the opening (11), and the rear end (145) protrudes outside of the chamber (10). According to a preferred embodiment, when the torch (140) is fully inserted through the opening (11) the front end (143) is essentially planar with the inner facing surface (14) of the lower part of the processing chamber (10). Alternatively, the torch (140) may be inserted through the opening such that the front end (143) extends into the melting zone (38).

According to a preferred embodiment, at least a portion of the outer surface (141) of the torch (140) that is situated in the opening (11) is recessed radially inward, thereby forming at least a recessed portion (41') of the outer surface (141) of the torch (140) having a smaller diameter than the rest of the torch (140). FIG. 3 shows a recessed portion (41'), extending longitudinally from near the front end (143) of the torch (140) to a portion of the torch (140) that protrudes outside the chamber (10). A heat protecting ring element (21) surrounds, and is integrally joined with the front end (143) of the torch (140). The recessed portion is enclosed by a coaxial sleeve (52), thereby forming an insulating chamber (54). At least a portion (56) of the coaxial sleeve (52) that surrounds the part of the plasma torch (140) that is situated in the opening (11) of the processing chamber (10) wall is comprised of porous or permeable material.

Preferably, at least the portion of the coaxial sleeve (52) that is located in the opening (11) is made of a high temperature resisting material, for example, a nickel alloy, stainless steel, ceramic material, or a combination thereof.

Figure 4:
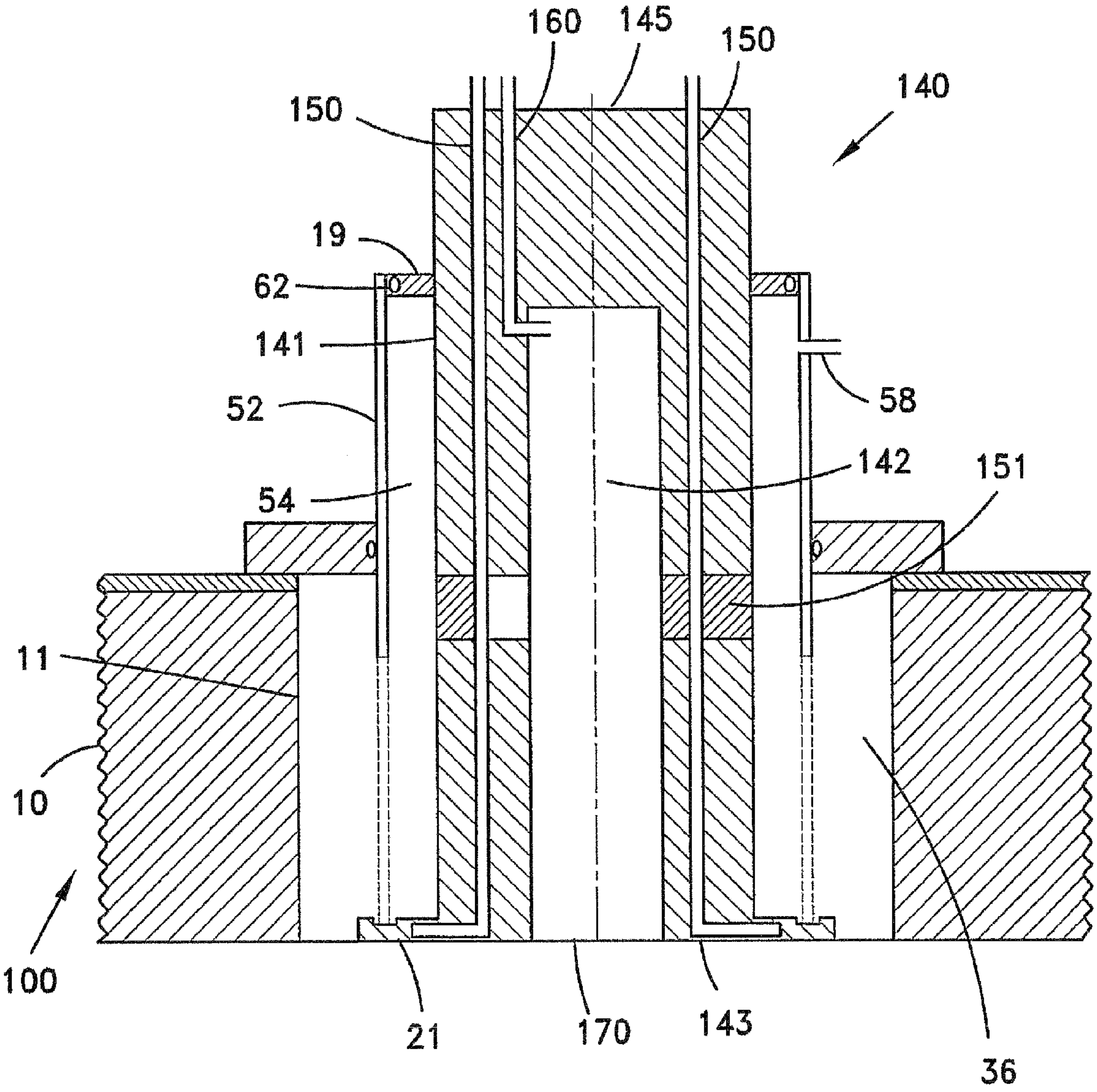
FIG. 4 shows, schematically, a longitudinal cross section view of another embodiment of the plasma torch of the present invention, inserted in an opening in the lower part of a processing chamber.

According to another embodiment of the invention, shown in FIG. 4, heat protecting ring element (21) integrally surrounds the front end (143) of the outer surface (141) of the torch (140), and annular spacing element (19), is located between the front end (143) and the rear end (145). The coaxial sleeve (52) is mounted around the outer surface (141) of the torch between the heat protecting ring element (21) and the spacing element (19).

According to a preferred embodiment, at least the portion of the coaxial sleeve (52) that is located in the opening (11) is sealed by a high temperature resistant material (62), such as a glass wool seal. According to an alternative embodiment, the portion of the sleeve (52) that is located in the opening (11) is in contact with the heat protecting ring element (21), but not sealed thereto, such that some heat exchanging fluid may flow between the sleeve (52) and the heat protecting ring element (21). At least the upper end of the sleeve (52) is sealed to the annular spacing element (19) by soldering or welding. Optionally, the annular spacing element (19) may be water cooled.

A heat exchanging fluid is introduced into the insulating chamber (54), such that a substantially annular ring of heat exchanging fluid surrounds at least a portion of the plasma torch (140). The heat exchanging fluid passes through the porous or permeable portion (56) of the coaxial sleeve (52) into the gap (36) where the medium at least partially absorbs the heat that is radiated from the surrounding processing chamber (10) wall, thereby removing heat from the plasma torch, and decreasing heat loss. According to some embodiments, the heat exchanging fluid additionally flows through the small space that separates the sleeve (52) from the heat protecting ring element (21). Following the absorption of heat, the heat exchanging fluid flows into the melting zone (38) at the lower part of the processing chamber (10), interacts with the waste contained therein, continues up the vertical shaft, and exits through gas outlet (18) (see FIG. 1).

In one embodiment of the present invention, inlet (58) for introducing the heat exchanging fluid into the insulating chamber (54) is situated at the portion of the coaxial sleeve (52) that protrudes outward from the furnace (100). In another embodiment (not shown) the heat exchanging fluid is introduced to the insulating chamber (54) through an inlet that traverses the body of the plasma torch (140) from the upper end (145), similar to inlet (160) which is used for feeding the operating gas to the central channel (142). Alternatively, the inlet traverses the body of the plasma torch (140) from the outer surface (141) above the sleeve. The heat exchanging fluid is introduced to the insulating chamber (54) at any location in the chamber (54).

It has been found by the inventors that, depending on the heat exchanging fluid, flow rate and on the thermal requirements of the plant (100), the optimal ratio of the outer diameter of the coaxial sleeve (52) to the inner diameter of the insulating chamber (54) of the plasma torch (140) that is surrounded by the sleeve (52) is preferably in the range of 1.01-1.5.

It is important to note that by separating the outer surface (141) of the torch (140) from the chamber (10) wall by the coaxial sleeve (52), even without introducing a heat exchanging fluid to the insulating chamber (54), the torch (140) absorbs approximately 50% less heat radiated from the chamber (10) wall.

The heat exchanging fluid that is used in the present invention is any suitable fluid that is capable of absorbing heat and carrying it away from the plasma torch and out of gap (36). Preferably, an oxygen rich gas, e.g. steam, air, oxygen, $CO_2$ or a mixture thereof, is used, for reasons that will be discussed herein below.

One problem that was discussed herein above relating to the operation of a plasma torch based processing plant (100) is that the oxidizing agent that is provided for oxidizing organic material in the plant (100) may actually lead to congestion of the apparatus and an increase in the viscosity of the molten material in the lower chamber, as well as bridging in the shaft, since the oxidizing flow, typically being at a much lower temperature than that of the inside of the processing chamber (10), cools areas of the waste in proximity to the flow. This problem can be reduced by preheating the oxidizing agent before it comes in contact with the waste in the processing chamber (10).

Therefore, in the present invention it is preferred that the heat exchanging fluid is comprised of a fluid that can aid in oxidizing the organic components of waste in the processing chamber (10). After the heat exchanging fluid passes through the sleeve (52) into the gap (36), the medium absorbs radiated heat, enters the melting zone (38) of the processing chamber (10) at a higher temperature than when it entered the sleeve (52), flows up the shaft and exits through the outlet (18). While in the gasification zone, the heat exchanging fluid and the waste react with the carbonaceous components (char). Thus, the present invention provides a method and apparatus to supply a preheated oxidizing agent to the processing chamber.

Even if the need for adding the oxidizer inlet (16) located in the gasification zone (28) of the processing chamber (10) (shown in FIG. 1), cannot be eliminated, the heat exchanging fluid that also acts as an oxidizing agent that is introduced into the processing chamber (10) in proximity to the torch (140) reduces the need for introducing large amounts of the cool oxidizing agent through the inlet (16), and also allows the oxidizing agent to flow at a slower rate through inlet (16), thereby preventing, or at least, significantly reducing the occurrence of congestion and bridging in the shaft.

One of the factors that influence the life of a plasma torch (140) is the type of plasma forming gas that is used for its operation. Although gases such as hydrogen, methane, argon and others may be used, air is the least expensive plasma forming gas that may be used. Unfortunately, the significant amount of oxygen contained therein leads to shortening the useful lifetime of the torch (140) due to high temperature oxidation of the metal components of the torch (140). A nitrogen rich gas, for example, will, as a result of the lower concentration of oxygen, reduce the rate of oxidation, and therefore, a longer life of the torch (140) will result.

According to one embodiment, separate supplies of nitrogen rich gas and oxygen rich gas are provided, wherein the nitrogen rich gas is fed into the plasma torch (140) through inlet (160) and utilized as its plasma forming gas, and the oxygen rich gas is fed into the insulating chamber (54) through inlet (58) and serves as the heat exchanging fluid, as described above.

The refractory material of the inside surface (14) of the chamber (10) may be damaged due to the high temperatures that are attained by the high temperature plasma jet (39) (typically, between 2500-7000 K) as it exits the plasma torch (140). Therefore, it would be desirable to reduce the temperature at the wall. The present invention accomplishes this by adjusting the speed of the heat exchanging fluid, as it enters the chamber (10), such that it is less than the speed of the high temperature plasma jet (39), as will be discussed herein below. Under these conditions, the high temperature plasma jet (39) will reach the surface of the molten material and will melt inorganic components of the waste, and most of the heat exchange fluid will flow along the upper surface (14) of the refractory material, thereby at least partially insulating the inner surface (14) from the heat radiated by the molten material.

Although increasing the cross-sectional area of the gap (36) reduces the speed of the fluid as it enters the chamber (10), a larger gap (36) allows greater heat losses. Therefore, a compromise must be made between the desired cooling effect and the need to prevent heat losses. It has been found by the inventors that, depending on the heat exchanging fluid used and on thermal requirements of the plant (100), the optimal ratio of the cross-sectional area of the gap (36) at the front end (143) of the plasma torch (140) to the cross-sectional area of the outlet (170) of the channel (142) of the plasma torch (140) is preferably in the range of 0.5-20.

Figure 5:
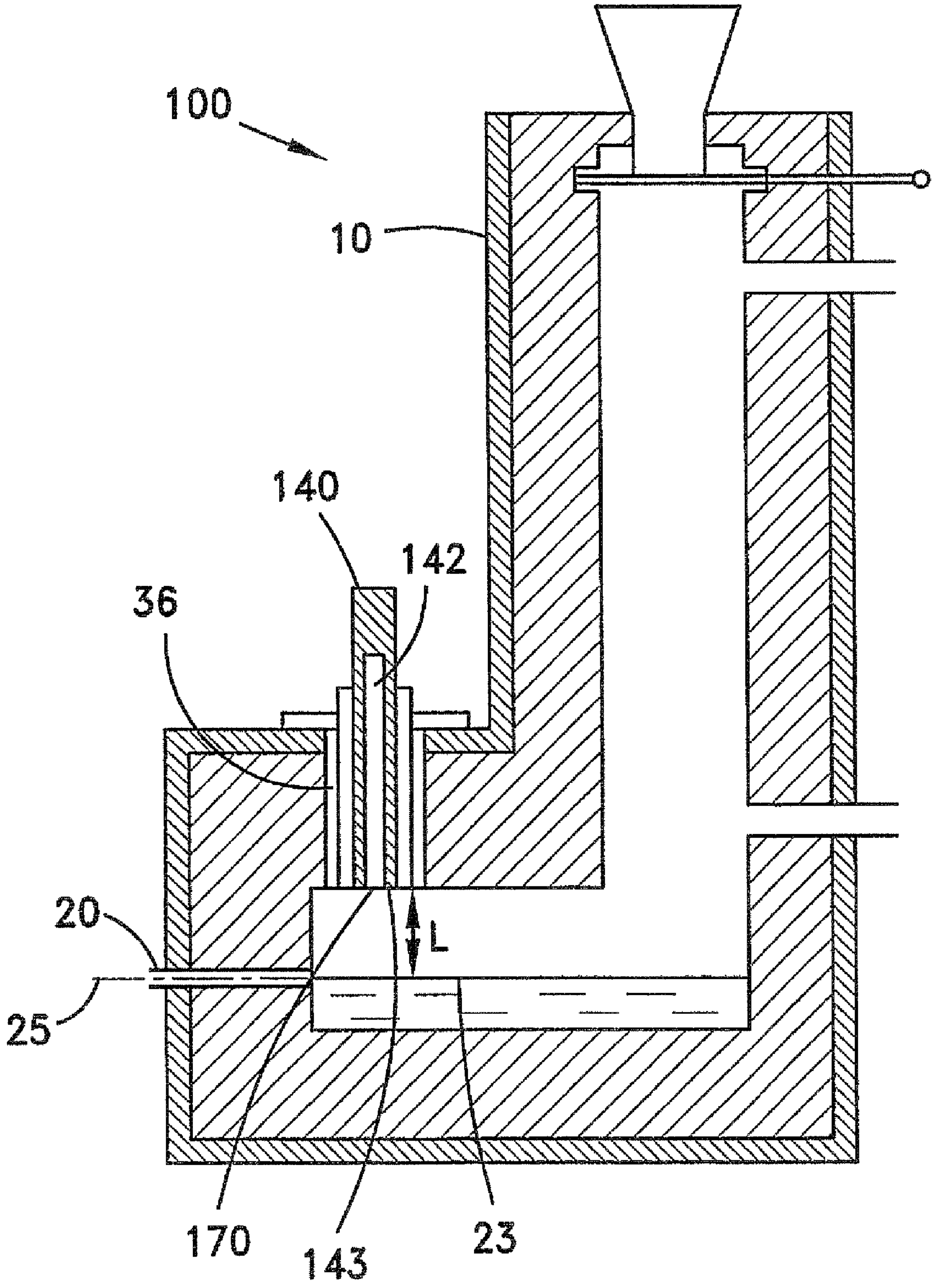
FIG. 5 shows, schematically, examples of dimensions of the plasma torch arrangement of the present invention.

Referring to FIG. 5, it has been further found by the inventors that, depending on the heat exchanging fluid. used and on thermal requirements of the plant (100), the optimal ratio of the diameter of the outlet (170) of the channel (142) to the minimal perpendicular distance (L) from the gap (36) at the front end (143) of the plasma torch (140) to a horizontal plane (23) including the central axis (25) of the liquid outlet (20) located at the lower part of the chamber (10) is preferably in the range of 0.02-0.3. Utilizing this ratio will prevent cooling of the melt by the heat exchanging fluid that flows into the lower part of the chamber (10).

The plasma torch of the present invention has been described with respect to the processing of waste in a particular design of a processing plant, the features of the plasma torch of the present invention can easily be adopted, mutatis mutandis, to other applications and processing chamber designed in which a material needs to be heated in a high temperature environment.

While the foregoing description describes in detail only a few specific embodiments of the invention, it will be understood by those skilled in the art that the invention is not limited thereto and that other variations in form and details may be possible without departing from the scope and spirit of the invention herein disclosed.

The invention claimed is:

1. A plasma torch for insertion through an opening in the wall of a waste processing chamber, said processing chamber having at least one liquid outlet at the lower part thereof, for removing molten material, said plasma torch comprising:

a body having a front end, a rear end, a longitudinal outer surface, an outlet through which the high temperature plasma jet exits and a heat protecting ring, both located at said front end;

a coaxial sleeve having an upper end and a lower end, said sleeve surrounding at least the portion of said longitudinal outer surface of said torch that is located in said opening in said wall, thereby forming an insulating chamber between said outer surface of said torch and the inner surface of said sleeve; and an inlet for introducing said heat exchanging fluid into said insulating chamber:

wherein at least a part of said portion of said coaxial sleeve that surrounds at least said portion of said longitudinal outer surface of said torch that is located in said opening in said wall is porous or permeable to a heat exchanging fluid.

2. A plasma torch according to claim 1, wherein when said plasma torch is inserted through the opening in the processing chamber wall, the coaxial sleeve and the insulating chamber shield the longitudinal outer surface of said plasma torch from a significant amount of the heat that radiates from the processing chamber wall and from inside said processing chamber.

3. A plasma torch according to claim 2, wherein when said plasma torch is operated, and when heat exchanging fluid is introduced through the inlet into the insulating chamber, said heat exchanging fluid passes through the porous or permeable portion out of said insulating chamber, thereby absorbing heat that radiates from the processing chamber wall and from inside said processing chamber, and carrying said absorbed heat away from said plasma torch.

4. A plasma torch according to claim 1, wherein an annular spacing element is located between said front end and said rear end, for joining the upper end of the coaxial sleeve thereto.

5. A plasma torch according to claim 4, wherein at least a portion of the outer surface of said torch is recessed radially inward, wherein the lower end of the coaxial sleeve is in contact with the heat protecting ring, and the upper end of said coaxial sleeve is sealed to the non-recessed portion of the outer surface, thereby forming the insulating chamber.

6. A plasma torch according to claim 5, wherein the upper end of the coaxial sleeve is sealed to the outer surface of said torch or to the annular spacing element, and the lower end of said sleeve is sealed to the heat protecting ring by a method chosen from the group consisting of:

a. soldering;

b. welding;

c. use of a glass wool seal.

7. A plasma torch according to claim 6, wherein the lower end of the coaxial sleeve is in proximity, but not sealed to the heat protecting ring, thereby forming a space between said lower end of said sleeve and said ring, whereby the heat exchanging fluid at least partially passes through said space.

8. A plasma torch according to claim 1, wherein the heat protecting ring is water cooled.

9. A plasma torch according to claim 1, wherein the ratio of the outer diameter of the coaxial sleeve to the inner diameter of the insulating chamber of said torch that is surrounded by said sleeve is preferably in the range of 1.01-1.5.

10. A plasma torch according to claim 1, wherein the inlet is situated at the portion of the sleeve that extends out of the chamber.

11. A plasma torch according to claim 1, wherein the inlet traverses the body of said torch from the rear end.

12. A plasma torch according to claim 1, wherein the inlet traverses the body of said torch from the outer surface.

13. A plasma torch according to claim 1, wherein the heat exchanging fluid is any fluid that is capable of absorbing heat and carrying it away from said torch and out of the gap.

14. A plasma torch according to claim 13, wherein the heat exchanging fluid is an oxygen rich gas and may be chosen from the group consisting of:

a. steam;

b. air;

c. oxygen;

d. $CO_2$;

e. A mixture thereof.

15. A plasma torch according to claim 1, wherein said torch utilizes nitrogen rich gas as plasma forming gas.

16. A plasma torch according to claim 1, wherein the coaxial sleeve is made of a high temperature resisting material chosen from the group consisting of:

a. stainless steel;

b. ceramic;

c. alloys;

d. a mixture thereof.

* * * * *